United States Patent [19]

Bondoc et al.

[11] Patent Number: 4,513,045
[45] Date of Patent: Apr. 23, 1985

[54] SHEET TYPE FELT

[75] Inventors: Alfredo A. Bondoc, South Bound Brook; Eugene J. Flood, Haddonfield; Frederick W. Sieling, Bound Brook, all of N.J.

[73] Assignee: GAF Corporation, Wayne, N.J.

[21] Appl. No.: 637,640

[22] Filed: Aug. 3, 1984

Related U.S. Application Data

[62] Division of Ser. No. 595,881, Apr. 2, 1984.

[51] Int. Cl.$^3$ ................................................ B32B 3/10
[52] U.S. Cl. ................................... 428/137; 428/131; 428/280; 428/284; 428/297; 428/314.4; 428/318.4; 428/920
[58] Field of Search ............. 428/131, 137, 154, 160, 428/280, 284, 286, 314.4, 318.4, 423.1, 425.1, 314.8, 297, 920

[56] References Cited

U.S. PATENT DOCUMENTS

| | | | |
|---|---|---|---|
| 3,094,447 | 6/1963 | Chamberlain | 428/280 |
| 4,214,032 | 7/1980 | Csikos et al. | 428/280 |
| 4,472,243 | 9/1984 | Bondoc et al. | 428/300 |

*Primary Examiner*—James J. Bell
*Attorney, Agent, or Firm*—Joshua J. Ward; Marilyn J. Maue; J. Gary Mohr

[57] ABSTRACT

Sheet type felt material comprising 5-20 wt % glass fibers, 40-80 wt % cellulosic fibers, 5-25% binder and 3-20 wt % asphalt. The felt is made on conventional felt making equipment and may be used as siding or roofing underlayment or as facer for foam insulating boards.

8 Claims, No Drawings

SHEET TYPE FELT

This is a division of application Ser. No. 595,881 filed Apr. 2, 1984.

BACKGROUND OF THE INVENTION

The invention relates to sheet type felt suitable for use as siding or roofing underlayment or as facer for foamed insulation boards. The felt has special characteristics, is economical to make and can be manufactured on conventional felt making equipment. The felt of the invention includes cellulosic fibers, glass fibers, binder and asphalt. Prior art products for the same end use are typically made from cellolosic fibers and do not include glass fibers, although U.K. Pat. No. 1,470,098 suggests broadly that a combination of glass and cellulosic fibers may be used. Typically, prior art felt products for the same intended end uses are first manufactured on conventional felt making equipment without inclusion of asphalt and are then saturated or coated with asphalt in a separate operation in a roofing mill. By contrast, felt of the invention is made in its entirety in a felt mill using conventional felt making equipment.

SUMMARY OF THE INVENTION

The present invention includes sheet type felt and process for making same as well as product made using such felt. Felt of the invention comprises on a dry basis:
(a) between about 40 and about 80 wt % cellulosic fibers;
(b) between about 5 and about 20 wt % glass fibers;
(c) between about 5 and about 15 wt % binder; and
(d) between about 3 and about 20 wt % asphalt.

In preferred embodiments binder comprises SBR latex and the cellulosic fibers are a mixture of long and short fibers.

The invention also includes a method of making felt which comprises:
(a) forming an aqueous slurry comprising on a dry basis:
  (1) between about 40 and about 80 wt % cellulosic fibers,
  (2) between about 5 and about 20 wt % glass fibers,
  (3) between about 5 and about 15 wt % binder; and
  (4) between about 3 and about 20 wt % asphalt in the form of asphaltic emulsion; and
(b) then forming felt from said slurry.

The invention also includes foamed insulating board comprising:
(a) a rigid closed cell foam core; and
(b) felt of the invention adhered to a face of said core.

DETAILED DESCRIPTION OF THE INVENTION

Sheet type felt material of the invention is useful primarily as underlayment for siding or roofing and as facing material in the manufacture of foamed insulation boards. As compared with the felt of the invention, the felt commonly used for these end uses is cellulosic felt containing a much greater amount of asphalt than is contained in the felt of the invention. Further, such prior art materials must be manufactured in two separate operations, i.e. the felt must first be manufactured and then saturated with asphalt. This normally involves manufacture of felt at a felt mill and then subsequent saturation of the felt at a roofing plant. By contrast, felt of the invention may be made entirely on conventional felt making equipment with asphalt being introduced into the original slurry from which the felt is formed. This results in a felt product which is much more economical to make and much lighter in weight than conventional asphalt saturated felt.

Conventional felt sheeting used as underlayment and as facers for foamed insulation boards is, as mentioned above, generally made of felted cellulosic fibers manufactured in a felt mill and wound in suitable roll sizes. The felt is then moved to a roofing plant where it is unwound and saturated with asphalt, after which it is rewound and subsequently used as underlayment or as facer material in the production of foamed boards. The process of the present invention eliminates the need for this uneconomical two stage processing system. According to the process of the invention product of the invention is made entirely on conventional felt making equipment and is immediately thereafter ready for use as underlayment or facer material.

Conventional underlayment material of the type mentioned above is generally deficient in porosity and frequently does not allow the desirably high transmission of water vapor needed to keep roof decking and underlying insulation dry. Product of the invention will transmit water vapor at about 10 to 20 times the rate of conventional felt facer or underlayment material and at the same time will remain as impermeable with respect to liquid water as the conventional products.

Conventional felt underlayment when used as underlayment for shingles does not normally lie flat when installed and tends to have ripples, undulations and distortions as well as to exhibit a tendency to buckle when exposed to high humidity. This complicates the installation of shingles over such underlayment. Product of the invention is more dimensionally stable, lies flat when installed, and does not present a buckling problem. Installation of shingles over product of the invention is, therefore, much more easily accomplished.

Another advantage of the product of the invention is weight. Conventional sheet type underlayment is manufactured in roll form and weighs about 10–15 lbs. per 100 square feet. This is about 3 times the weight of typical felt of the invention. It is thus feasible to manufacture felt of the invention in larger rolls. This simplifies handling, transportation and installation with respect to large jobs such as laying underlayment on roof decking.

Felt of the invention is especially useful as felt facer for rigid foamed insulation boards such as are used in forming built-up roofing on roof decks and as foam insulation sheathing used on siding. Such boards have a core of conventional rigid closed cell foam material, the cells of which normally contain fluorocarbon gas. Polyurethane or polyisocyanurate foams are most commonly used. Other foamable polymers known for use in such boards include for instance polyvinyl chlorides, urea formaldehydes, melamine, polystyrene, polypropylene, polyethylene, expoxy resin, acrylonitrile-butadiene-styrene copolymer, cellulose acetate, etc. Rigid foam boards of this type are well known and are described in a number of patents including U.S. Pat. No. 4,351,873, the disclosure of which is incorporated herein by reference. Conventional foamed insulation boards have been faced with various materials. Conventional facers in addition to the asphalt saturated felt mentioned above have included for instance metal foil, synthetic fiber mat, etc.

Generally speaking, facers used on conventional foamed insulation boards have not been economical and have tended to have weak adhesion to the foam core. This has resulted in various problems, especially in the manufacture of built-up roofing (BUR). In applications such as BUR, foamed insulation boards faced with conventional asphalt saturated felt are prone to warping due at least in part to facer dimensional instability and when mopped with hot asphaltic materials the facer tends to delaminate from the foam. In addition severed frothing of asphaltic material is frequently encountered leaving voids and poor contact within the BUR system.

Felt product of this invention when used as facer for foamed insulation board produces an insulation board that is not susceptible to warping at different humidity conditions. Further, such facer does not cause hot asphalt to froth when mopped onto it, has strong adhesion between facer and foam and will not delaminate from foam when mopped with hot asphalt. Felt and insulation board products of the invention also have a wide sphere off application in roofing systems where material compatibility is necessary. For instance it is generally considered undesirable to allow direct contact between insulation board faced with conventional asphalt saturated felt facers and single ply polyvinylchloride roofing membrane due to possible plasticizer migration. Insulation board faced with felt of the invention presents considerably less problems with respect to possible plasticizer migration under these circumstances.

Conventional asphalt saturated felt facers for insulation boards have poor fire resistance characteristics and do not retain sheet skeletal integrity when burnt. Insulation boards faced with felt of the invention have greatly improved fire resistance characteristrics due to lower fuel value per unit area and greater sheet integrity after burning. These characteristics are especially desirable on facers of foamed insulation boards in BUR systems as tested by the Factory Mutual Class 1 Calorimeter Test.

A common problem in using foamed insulation boards, especially those with polyurethane or polyisocyanurate foamed cores faced with asphalt saturated felt facers, is that blistering of the facer can occur when it is mopped with hot asphalt at about 500° F. Such blistering takes the form of bubbles on the insulation board when the facer delaminates from the polyurethane foam. This occurs within the foam itself rather than at the interface between the facer and the foam. In the manufacture or urethane foam boards a very thin integral skin of polyurethane or polyisocyanurate is formed between the facer and the actual foam matrix. The blistering occurs underneath the skin when the expanded gases cannot escape into the atmosphere and thus pushes on the skin and facer and forms bubbles. In a further aspect of the present invention such blistering can be eliminated by perforating the boards after they are manufactured, i.e. after the boards have been foamed and facers affixed. Such perforations are preferably in the form of small holes of about 0.02–0.1 inch diameter spaced apart from about ¼ inch to about 1½ inches on centers. The perforations should be of sufficient depth so that both the facer and the integral urethane skin are penetrated by the perforations.

Cellulosic fibers suitable for use in products of the invention include any of the cellulosic fibers commonly used in making cellulosic felt of the type commonly used as underlayment and facer for insulation boards and may include for instance fibers derived from wood, paper, rags, etc. For economic reasons waste paper such as waste newsprint, waste kraft corrugated paper, etc. is frequently used. Blends of long and short cellulosic fibers are preferably used in order to obtain felt of desired porosity. In this respect preferred blends contain between about 25 and about 75 wt % short fibers with between about 25 and about 75 wt % long fibers. Cellulosic fibers are used in felt of the invention in amounts between about 40 and about 80 wt % on a dry basis with amounts between about 60 and about 75 wt % on the same basis being preferred. Fibers of the type normally used in making newsprint are for instance a suitable source of short fibers and fibers of the type normally used in making kraft paper are for instance a suitable source of long fibers. Suitable short fibers normally have lengths between about 0.5 and about 1.5 millimeters. Suitable long fibers normally have lengths between about 1.5 and about 3.5 millimeters.

Glass fibers are present in felt of the invention in amounts of between about 5 and about 20 wt % on a dry basis and more preferably in amounts between about 10 and about 15 wt % on the same basis. Chopped glass fibers are especially preferred. Glass fibers used normally have diameters between about 3 and about 20 microns with fibers having diameters in the general range of about 5–13 microns being especially preferred. Fibers of substantially smaller diameters are sometimes unsatisfactory because of the deleterious effect on felt formation using conventional paper making machines and, in addition, may present health problems. Glass fibers used in the invention normally have lengths between about 3 and about 15 millimeters. Conventional glass fibers of nominal ¼ inch length are especially satisfactory with fibers of nominal ½ inch length also being suitable.

Binder is used in felt of the invention in amounts between about 5 and about 15 wt % based on dry felt with amount between about 5 and about 10 wt % on the same basis being preferred. Suitable binders include for instance acrylamides, starch, urea resins, phenol resins, sodium silicates, epoxy resins, etc. Other suitable binders include for instance styrene/butadiene rubber (SBR) latex, as well as acrylic, neoprene, acrylonitrile or other natural or synthetic latices. SBR latex is a preferred binder and is preferably a carboxylated type of SBR latex substantially free of surfactants. A preferred SBR latex is for instance that made by continuous monomer addition without the use of surfactant as taught for instance by U.S. Pat. No. 4,378,272. Such a latex not only functions as a binder for the felt of the invention but can also act as an ionic exchange resin and help relieve the build up of certain undesirable materials in a closed water system for felt manufacture.

Other binders such as those mentioned above may, however, be used.

Felt of the invention also contains between about 3 and about 20 wt % asphalt on a dry basis. Asphalt used in making felt of the invention should generally have a relatively high softening point and relatively low penetration characteristics. Asphalt of low softening point or high penetration characteristics tends to cause problems in the operation of the conventional paper making equipment on which most felt is made. In practicing The invention it is preferred to use an asphaltic emulsion made with asphalt having a ring and ball softening point of at least about 155° F. and penetration at 77° F. of not more than about 5 millimeters as determined in accordance with ASTM D-5. These characteristics are desirable due to potential processing problems on paper making machines with sticking and accumulation build up on equipment being particularly pronounced at high levels of usage of asphalt. Asphalt is preferably introduced into felt of the invention by adding conventional asphaltic emulsion to the slurry from which the felt is formed. For this purpose any of the normally available asphaltic emulsions made from asphalt having desired characteristics may be used.

In addition to the required ingredients of felt of the invention described above, other conventional ingredients used in felt manufacture may also be included including for instance flocculants, defoaming agents, precipitants, etc. Suitable flocculants include for instance high molecular weight cationic acrylamide polymer such as Betz 1260 and may be used in amounts of, e.g. between about ½ lb. and about 8 lbs. per ton of dry felt. Suitable precipitants include for instance multivalent metal salts or synthetic polymers. Pigment may also be used for optional coloring of felt of the invention. A preferred pigment is carbon black which can be fixed onto the matrix of the felt with multivalent salts or polymeric flocculants. Any pigment used should preferably not leach out when the finished product is soaked in water for prolonged periods of time.

Felt of the invention may be manufactured in a conventional manner on conventional felt making equipment such as single cylinder or Fourdinier machines. Felt thickness may vary widely but is typically between about 0.4 and about 4.0 millimeters. In order to provide the desired matrix for preferred end uses, a dry felt apparent density between about 15 and about 35 lbs. per cubic foot is preferred.

In preparing felt of the invention the cellulosic fibers may be dispersed in a water slurry in suitable equipment such as a hydrapulper. When the cellulosic fibers are fully dispersed, the glass fibers are added and thoroughly dispersed within the slurry of cellulosic fibers. Asphaltic emulsion may then be added and thoroughly mixed into the slurry, after which the binder may be added and mixed thoroughly into the slurry. Binder and asphaltic emulsion are then normally precipitated in the slurry using, e.g. aluminum sulphate. Stock consistency is adjusted as desired and the completed stock may be decanted to the forming end of a conventional paper making machine, at which point flocculant is usually added and mixed thoroughly with the slurry prior to forming the felt product. Other ingredients which may be used may be added at any suitable point during the processing. Subsequent processing usually includes pressing for water removal followed by drying and winding into rolls.

Depending upon the characteristics desired in the felt product of the invention, mineral filler may be added to the slurry from which the felt is made. When used, mineral filler is preferably used in amounts between about 5 and about 50% by weight of finished felt on a dry basis. The filler may for instance be added to aid in reducing porosity of the felt. Desirable fillers include for instance limestone and Portland cement. Other conventional fillers such as talc, clay and perlite may be desirable for some end uses but are generally considered undesirable for use in felt to be used as facer on insulation board since these fillers tend to induce frothing when such boards are mopped with hot asphalt. Where used, filler may be added to the slurry from which the felt is formed at any desirable point during the formation of the slurry.

As mentioned above, insulating board of the invention comprises a core of conventional closed cell foam material faced with felt of the invention. Depending upon the intended use such boards normally have core thicknesses between about 25 and about 100 millimeters. For this use felt of the invention preferably has a thickness between about 0.4 and about 1 millimeter, although thicker felt may be used. Boards of the invention may be made in a conventional manner with the rigid foam preferably being formed and cured in contact with felt of the invention so that the resulting facing is continuously adhered to the rigid foam core. However, it is possible to form the core without a facing and then bond one or more facings to the core using suitable adhesives. In general, the teachings of U.S. Pat. No. 4,351,873, are applicable to the formation of rigid foam cores and adhesion of facer to at least one face of such cores. The distinguishing characteristic of insulation boards of the present invention is use of felt of the invention as a facer on conventional rigid foam cores.

The following examples are intended to illustrate the invention without limiting the scope thereof.

EXAMPLE 1

Felt of the invention was made on a conventional paper making machine using the following formulation on a dry basis.

| Ingredient | Wt % |
| --- | --- |
| Waste newsprint | 36 |
| Waste Kraft Corrugated Paper | 36 |
| Glass Fiber - ¼ inch K Filament | 13 |
| SBR Latex | 5 |
| Asphaltic Emulsion | 7 |
| Carbon Black | 3 |

The cellulosic materials were dispersed thoroughly in water using a hydrapulper. Glass fibers were introduced and dispersed next, followed by the asphaltic emulsion, SBR latex and carbon black. Aluminum sulphate was then added to precipitate the binder and consistency was adjusted prior to feeding the stock to the paper machine, at which point a flocculant was also added. The felt was formed, pressed, dried and wound into jumbo rolls for use as facer for urethane modified polyisocyanurate rigid foam insulation boards. The felt had the following characteristics:

| Characteristics | Numerical Value |
| --- | --- |
| Basis wt. - lbs/480 sq. ft. | 27 |
| Caliper - inches | 0.023 |
| Tensile Strength - lbs/inch | |
| Machine Direction | 59 |
| Cross Machine Direction | 33 |
| % Expansion when soaked in water for 24 hours | |
| Machine Direction | 0.24 |
| Cross Machine Direction | 0.55 |

The felt as produced had a smooth surface, light weight, good strength and superior dimensional stability as compared with commonly used asphalt saturated organic felt.

The felt made as described in this example was then used as facer in the manufacture of urethane modified polyisocyanurate rigid foam insulation boards of 1.4 inch thickness. The completed boards faced with this felt were then perforated with perforations ¼ inch deep on 1 inch centers. The finished boards did not blister when mopped with hot (500° F.) asphalt and passed the Factory Mutual Class 1 Calorimeter Test on a built-up roofing system.

EXAMPLE 2

Using the same equipment and method of preparation as in Example 1 felt of the invention for use as roofing shingle underlayment was prepared using the following ingredients:

| Ingredient | Wt % |
| --- | --- |
| Waste Newsprint | 37.5 |
| Waste Kraft Corrugated Paper | 37.5 |
| Glass Fiber ¼ Inch K Filament | 10.0 |
| SBR Latex | 5.0 |
| Asphaltic Emulsion | 7.0 |
| Carbon Black | 3.0 |

This felt was tested for physical properties and for comparison a commercial asphalt felt shingle underlayment was also tested with the following results:

| Physical Properties | Felt of Invention | Asphalt Saturated Commercial Felt Shingle Underlayment |
| --- | --- | --- |
| Basis wt., lbs/480 ft | 20 | 68 |
| Caliper, inches | 0.018 | 0.028 |
| Tensile Strength lbs/inch | | |
| Machine direction | 69 | 61 |
| Cross Machine direction | 24 | 25 |
| % Expansion, water soaked for 24 hours | | |
| Machine direction | 0.16 | 0.11 |
| Cross Machine direction | 0.78 | 1.20 |
| Water Vapor Transmission, grams/m² for 24 hrs | | |
| ASTM E-96 Dessicant Method at 73° F., 50% RH | 330 | 7 |
| ASTM E-96 Inverted Water Cup at 73° F., 50% RH | 708 | 78 |
| Liquid Water Transmission* | None | None |

*Liquid water transmission testing was conducted as follows: the bottom of a 1 quart paint can was cut off and the can's edge sealed to a felt sample. The can was filled with tap water to a height of 4 inches covered lightly, and observed for 7 days for signs of water draining through the sample.

While the invention has been described above with respect to preferred embodiments thereof it will be understood by those skilled in the art that various changes and modifications may be made without departing from the spirit or scope of the invention.

What is claimed is:

1. Rigid foamed insulation board comprising:
   (a) a rigid closed cell foam core; and
   (b) sheet type felt adhered to a face of said core, said felt comprising on a dry basis:
   (1) between about 40 and about 80 wt % cellulosic fibers;
   (2) between about 5 and about 20 wt % glass fibers;
   (3) between about 5 and about 15 wt % binder; and
   (4) between about 3 and about 20 wt % asphalt.

2. Insulation board according to claim 1 having perforations extending through said felt and into said core.

3. Insulation board according to claim 2 wherein said perforations are between about 0.02 and about 0.1 inch in diameter and are spaced between about ¼ inch and about 1½ inches apart on centers.

4. Insulation board according to claim 1 wherein the cellulosic fibers contain between about 25 and about 75 wt % short fibers and between about 25 and about 75 wt % long fibers.

5. Insulation board according to claim 1 wherein the asphalt has a ring and ball softening point of at least about 155° F. and a penetration at 77° F. of not more than about 5 millimeters.

6. Insulation board according to claim 1 wherein the binder is SBR latex.

7. Insulation board according to claim 1 wherein the glass fibers have diameters between about 3 and about 20 microns and lengths between about 3 and about 15 millimeters.

8. Insulation board according to claim 1 wherein:
   (a) the cellulosic fibers are between about 25 and about 75 wt % short fibers and between about 25 and about 75 wt % long fibers;
   (b) the asphalt has a ring and ball softening point of at least about 155° F. and a penetration at 77° F. of not more than about 5 millimeters;
   (c) the binder is SBR latex;
   (d) the glass fibers have diameters between about 3 and about 20 microns and lengths between about 3 and about 15 millimeters.

* * * * *